June 4, 1940.   J. C. BURFORD   2,203,046
LUBRICANT ATOMIZER AND HEATER FOR FORCE FEED LUBRICATORS
Filed April 14, 1939   2 Sheets-Sheet 1
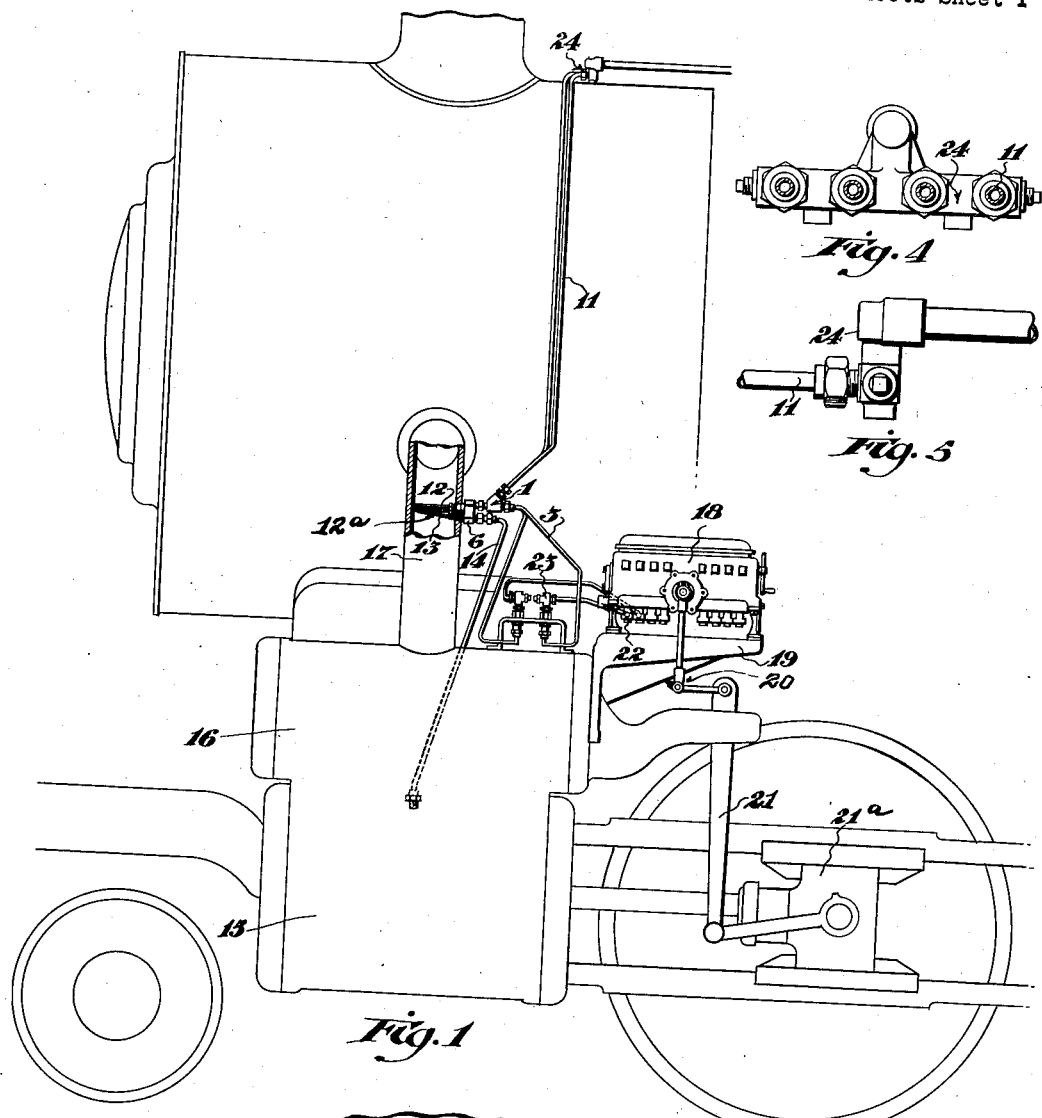
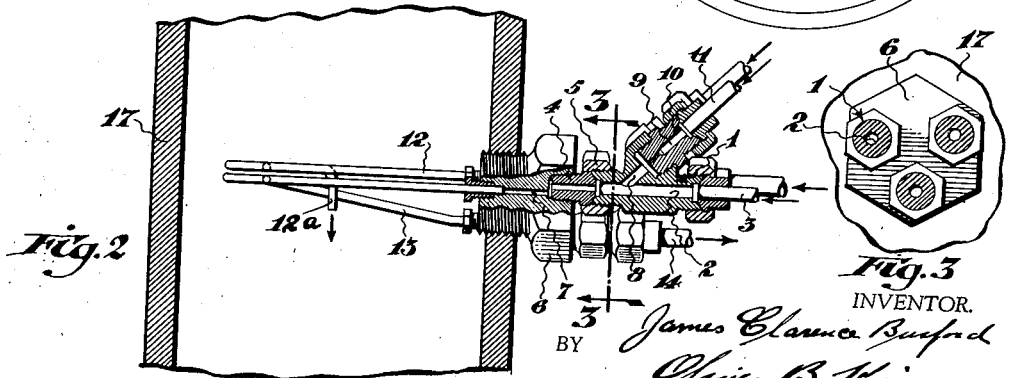
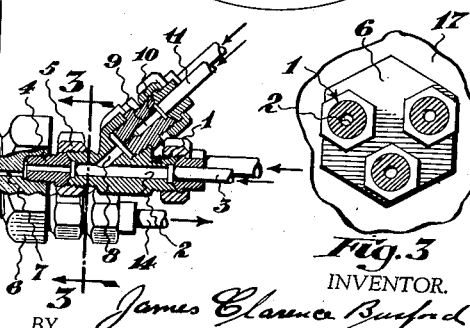
INVENTOR.
James Clarence Burford
BY
Olivia B. Kaiser
ATTORNEY.

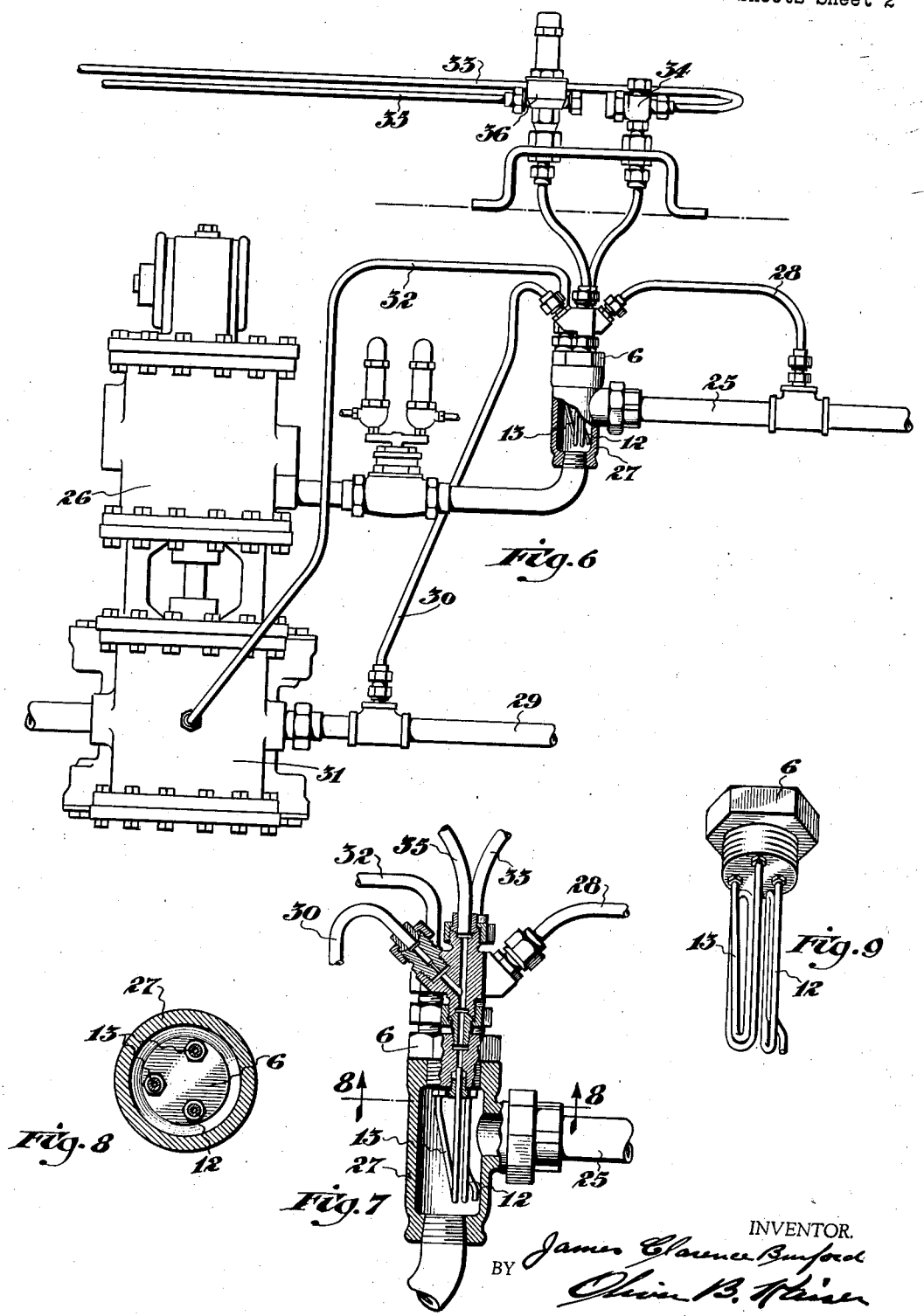

Patented June 4, 1940

2,203,046

UNITED STATES PATENT OFFICE 2,203,046

LUBRICANT ATOMIZER AND HEATER FOR FORCE FEED LUBRICATORS

James Clarence Burford, Winston-Salem, N. C.

Application April 14, 1939, Serial No. 267,826

2 Claims. (Cl. 184—55)

This invention relates to improvements in atomizers for use in connection with force feed lubricators of the class and type as employed for locomotive lubrication. The atomizer primarily is for the purpose of injecting lubricant into a steam line or chamber, where it is of advantage to have the lubricant distributed in a dispersed or finely diffused state and preheated.

In the atomizer a blast or flow of steam or air is presented preferably at an angle to the direction of the flow of the lubricant moving under pressure to disperse the lubricant, and therewith flow and pass through a heating coil before discharge or delivery. The improvement is admirable for lubricating the cylinders of steam engines and air pumps of locomotives, or chambers having a high internal working pressure, necessitating the lubricant to be injected relatively at any equal or greater pressure.

In lubricating a steam cylinder, the pressure medium for atomizing the lubricant is steam taken either directly from the boiler or from the steam supply line to the cylinder, and it is desirable to inject or deliver the lubricant into the steam line of the cylinder, as well as directly into the cylinder; the improvement therefore provides for connecting the atomizer to the steam line and providing the atomizer with a coil extended therefrom for insertion into the steam line in the installation of the atomizer for heating the lubricant by the steam in the line before discharge therein. This permits the cylinder to be lubricated while it is being supplied with steam.

The engine operates the lubricator, so that the lubrication control is consistent and simultaneous with the control or operation of the engine. Thus, lubricant is supplied as soon as the engine is started, and cut off upon stopping the engine.

An object of the invention is to provide means adapted to be interposed within a feed line of a force feed lubricator for atomizing or dispersing, and heating the lubricant before it is discharged to or within the part to be lubricated.

Another object of the invention is to provide a lubricant atomizer for use in connection with a distributing or feed line of a force feed lubricator, for atomizing or dispersing a lubricant, and having its delivery end in connection with a heater coil extended into a steam supply pipe for heating the atomized fluid before it is discharged or distributed therein.

Another object of the invention is to provide a lubricant atomizer for interpositioning in a feed line of a force feed lubricator for steam or the like, cylinders, wherein the pressure fluid for atomizing the lubricant is taken either directly or indirectly from the pressure fluid supply to the cylinder, and the atomized lubricant heated before discharge, by passing the same through a heating coil carried by the atomizer and extended into the steam line, and further in a unit assembly of a plurality of atomizers for extending the heating coils thereof into a heating line from a common fitting for making a single installation connection with the heating line and utilizing one of the atomizers for distributing lubricant in said heating line.

Futher features and advantages of the invention are more fully set forth in a description of the accompanying drawings, in which:

Figure 1 is a diagrammatic side view of the forward end of a steam locomotive, illustrated as equipped with a force feed lubricator and a lubricant atomizer distributor in conduit connection therewith, shown in a side elevation for supplying lubricant to the steam line leading to the driving engine and to the cylinder thereof.

Figure 2 is an enlarged central vertical section through the atomizer as installed in the steam pipe to the engine cylinder.

Figure 3 is a section on line 3—3, Figure 2.

Figure 4 is a detailed end view of a manifold employed for dividing the steam supply line, in an application having a plurality of lubricant atomizers.

Figure 5 is a side elevation of the manifold shown in Figure 4.

Figure 6 is a side elevation of a layout for supplying lubricant to the steam and air cylinders of a locomotive air pump.

Figure 7 is an enlarged central vertical section through the atomizer shown in Figure 6.

Figure 8 is a section on line 8—8, Figure 7.

Figure 9 is a detailed perspective view of a plug with a heating coil extending from the inner end thereof.

Either steam or air may be used for atomizing the lubricant, and an instance of each for locomotive service is featured herein. It has been experienced that greater efficiency and dispersion of lubricant can be obtained by passing the vapor and oil through a heating coil or zone before it is distributed.

As one of the distributing points usually is within a steam line, it has been found expedient to utilize also such connection for heating, and which has been accomplished by compactly arranging and projecting the heating coils of one or several atomizers from the forward end of a plug or fitting employed for making an installation connection and extending the coils into the steam line with one of the coils directly discharging the heated lubricant into said line.

Referring to Figures 2 and 3, 1 indicates the body of an atomizer having a longitudinal bore or passage 2 therethrough. The body at the opposite ends of the bore or passage 2 is formed for making double ended couplings or union pipe connections. Each end is machined to provide a tapering or conical seat or socket, and externally screw threaded for receiving a union clamping nut.

A lubricant supply pipe 3 connects with the forward or intake end of the passage 2, and the opposite or outlet end of said passage has a union nipple 4 connected to the body by a union nut 5. The union nipple 4 is screw threaded into the outer end of a screw plug 6, connected to a steam line into which a lubricant is to be served, and for utilizing the steam in the line as a medium for heating the lubricant passing through a coil leading from an atomizer and projecting from the forward end of the plug to which the coil is attached.

The passage or bore 7 in the plug is preferably eccentric to the atomizer passage or bore 2 through the union nipple 4; the offsetting of the passages providing an interruption from a straight line course, aiding in dispersing and mixing the oil with the steam injected into the passage 2. The atomizer body is provided with a steam passage 8, disposed at an angle preferably acutely to the passage 2. The inlet end of the steam passage 8 is connected with a restricted port 9 in a coupling nipple 10 screw threaded into the body and in union or coupling connection with a steam supply pipe or tube 11. The atomizer structure may be variously modified from the disclosure herein, insofar as it is applicable in connection with the means employed for heating the lubricant in advance of delivery to the part to be lubricated. In the present instance, the lubricant passage or chamber 2 is in line with the outlet and the ejector or fluid pressure passage, at an angle thereto. This, however, can be reversed or altered by having the lubricant admitted at an angle and the steam inlet in line with the outlet.

The connector plug 6 is of a size, and bored to carry at its outer end, a pair or several atomizers, a duplication in structure of the atomizer above described. The plug 6 at its inner or forward end carries one or a plurality of heating coils, one respectively for each atomizer. Each coil consists of a length of tubing bent into a loop or into one or more convolutions of longitudinal design and extending from the end of the plug, to permit the plug to be inserted through a tapped opening in the steam line of a diameter to connect the plug.

When one of the atomizers is used for supplying lubricant into the steam line, its heating coil, as coil 12, has one end attached to the plug communicating with a port through the plug and in connection with the delivery passage 2 of an atomizer. Its opposite end, as shown in Figure 2, is bent to an angle to discharge downwardly centrally of the steam pipe or line as shown at 12A.

A second heating coil 13 has both of its opposite ends connected to the plug, one in connection with a port through the plug and with a second atomizer carried by the plug, and the other with a port through the plug, connecting with a lubricant delivery pipe or tubing 14 attached at one end to the plug, and its opposite end to a tap fitting attached to the engine cylinder for serving lubricant to the interior of said cylinder.

The drawings illustrate several different applications of the improvement upon a steam locomotive; in one instance to supply lubricant in an atomized state within the steam line of the driving engine and into its cylinder, and in the second, for an air pump selected primarily for the purpose of exemplification and not particularly limited to such uses.

The atomizer in Figure 1 is shown as installed for supplying lubricant to the steam supply line or pipe for one of the locomotive driving engines, and to the engine driving cylinder, located at one side of the front end of the locomotive. Similar installation is made for the driving engine on the opposite side of the locomotive and is a duplication of that shown in Figure 1. No illustration thereof is made herein.

The atomizing distributor is preferably of duplex form, combining into a unit, two independent atomizers offering advantage and convenience in installation and providing for compactness in its manufacture.

In Figure 1, illustrating in diagram the forward end of a steam locomotive, 15 indicates the cylinder of the locomotive driving steam engine, located at one side of the forward end of the locomotive; 16, the steam chest therefor, and 17, the steam supply line or pipe connecting with the upper side of the steam chest and extending upwardly and into the side of the smoke box or boiler, for connecting with the boiler in the conventional manner, and follows one type of locomotive construction.

A force feed lubricator 18, of conventional type, is shown mounted upon the locomotive at a convenient location, as upon a bracket 19, fixed to and extending from the rear head of the steam chest of the engine, and provides the medium for supplying the lubricant under pressure to the atomizer and other parts of the locomotive to be lubricated. The force feed lubricator 18 is of a type providing for a plurality of outlets or feeds, each of which usually has its own forcing apparatus in the nature of a plunger pump, with all of the plungers, incorporated in the lubricator unit, operated by a common shaft engaged through the lubricator casing and in operative connection with a crank and lever transmission mechanism 20 connecting with an operative part of the locomotive, in the instance shown, in Figure 1, with the combination lever and cross head 21a of the engine, so that operation thereof is always effective when the locomotive is in motion. The feed outlets of the several forcers or pumps are generally disposed in a longitudinal row on the base or lower side of the lubricator casing, and each forcer or pump has provision for governing its volume of discharge, which is regulated to meet the lubricant requirements of the part or parts to be supplied and in connection therewith.

Each feed line from the lubricator, particularly when employed to supply the lubricant to a part having a high internal pressure, as a steam line or engine cylinder, has a pressure responsive valve, commonly termed a terminal check valve, interposed in the line for governing and controlling the delivery pressure of the lubricant for discharge at a pressure in excess of the internal or counter-pressure within the part to be lubricated. The terminal valve employed in the atomizer distribution system may be of any of the conventional types now generally employed in locomotive force feed lubricating systems, either a ball or diaphragm type characteristic, in that the valve normally is closed to the lubricant delivery side until the lubricant pressure in the feed line reaches a predetermined degree to unseat or open the valve for the expulsion of a charge of lubricant, and then close until the lubricant pressure again arises for a subsequent valve unseating operation. For distributing atomized lubricant to the steam line 17, suplying steam to the driving chest 16, the lubricant supply line 3 of an atomizer attached to the steam line connects with an outlet 22 of the lubricator 18. A pressure responsive, or terminal valve 23, is interposed in the atomizer supply line 3 for a delivery of the lubricant into the steam line, at or in excess of the steam pressure in said steam line. The steam supply line 11 for the atomizer preferably extends upwardly to the top of the locomotive boiler and connects with a manifold or distributor 24 in pipe connection with the boiler or other steam supply source, the manifold primarily serving to subdivide the supply line to individually serve several atomizers for lubricating the steam engines at the oposite sides of the locomotive. Two steam lines therefor lead from the manifold 24 downwardly from each side of the front end of the boiler of the locomotive each connecting with its respective atomizer of the atomizer unit, mounted upon the steam line 17.

The steam supply to an atomizer is continuous, while the lubricant supply is intermittent, the frequency depending upon the action of the terminal valve, which necessitates raising the pressure of the lubricant to a sufficient degree to open the valve for feeding the lubricant to the atomizer. As the lubricant is forced into the atomizer, it is dispersed under the action of the inflowing steam and intermixed therewith, whence the flow continues through the heating coil, wherein the products are heated before discharged.

In Figures 6 to 9 inclusive, an atomizer unit is shown for use in connection with the steam and air cylinders of an air pump. In such instance, it is preferable to connect the atomizer unit, combining a plurality of independent atomizers of duplicate construction correspondingly as heretofore described, to a pipe fitting interposed in the steam supply line leading from the boiler to the driving cylinder of the air pump an installation detail thereof being shown in Figure 6. In said figure, 25 indicates the main steam supply line or pipe leading from a boiler to the steam cylinder 26 of the air pump, having a T-fitting 27 interposed therein, into which an atomizer unit is installed. The plug 6 of the atomizer unit is screw threaded into one end of the T-fitting to project its heating coils longitudinally therein. The heating coil 12 supplies lubricant to the steam line 25, so that lubricant is carried with the steam into the air pump steam cylinder. The heating coil 12 has an outlet end directed downwardly to discharge in a direction corresponding with the direction of steam flow, thereby differentiating from the disposition of the outlet end of the coil, as previously described, for delivery of the lubricant into the main steam line for the cylinders of the driving engine. The steam supply for the atomizer of the coil 12 is taken from the same steam line 25, supplying the steam to the steam cylinder of the pump, ahead of the point of installation of the atomizer unit, by a pipe 28 at one end suitably connected to the steam pipe 25, and at its opposite end, to the steam intake of one of the atomizers.

As it is not desirable to use steam for atomizing the oil for lubricating the interior of the air cylinder of the air compressor, air is substituted; therefore, the second atomizer unit connected to the steam line 25, has its pressure inlet end connected with the air discharge line 29 by a pipe 30. The air discharge line pipe 29 leads from the air cylinder 31 of the air pump. The air supply pipe 30 connects with the heating coil 13 of the atomizer unit, and the coil, by a pipe 32, connects with the air cylinder 31 and preferably centrally thereof.

Each atomizer of the unit has its own supply line connecting respectively with an outlet of a force feed lubricator, and, as shown in Figure 6, oil supply line 33 leading from the force feed lubricator, connects with one of the atomizers for distributing the lubricant to the steam line 25, leading to the steam cylinder of the pump, the line 33 having a terminal valve 34 interposed therein in advance of the atomizer. Likewise, a second oil supply pipe 35 leads from the lubricator to the second atomizer, having a terminal valve 36 interposed therein for supplying lubricant to the atomizer connecting with the air compressor cylinder 31 of the pump.

Having described my invention, I claim:

1. A lubricator for engine cylinders and the like, comprising: a bushing for mounting in a steam conveying conduit, a coil of tubing connected to the inner end of said bushing and projecting longitudinally therefrom and within the diameter of the bushing for inserting and laterally extending the same within said conduit to heat the fluid passing through the coil before discharge into the conduit, the tubing communicating with a passage through the bushing, a nozzle connected to the outer end of said bushing having an atomizing chamber therein, one end thereof in communication with the passage through the bushing and at an opposite end with a lubricant supply conduit, and a steam supply passage in said nozzle communicating with said atomizing chamber and at an angle thereto and in communication with a steam supply source for dispersing the lubricant in said chamber and forcibly dispensing the same through said coil of tubing and into the steam conduit.

2. A lubricator for engine cylinders and the like, comprising: a bushing for mounting in a steam conveying conduit, a coil of tubing connected to the inner end of said bushing and projecting longitudinally therefrom and within the diameter of the bushing for inserting and laterally extending the same within said conduit to heat the fluid passing through the coil, the tubing communicating with a passage through the bushing, a nozzle connected to the outer end of said bushing having an atomizing chamber therein, one end thereof in communication with the passage through the bushing and at an opposite end with a lubricant supply conduit, and a steam supply passage in said nozzle communicating with said atomizing chamber and at angle thereto and in communication with a steam supply source for dispersing the lubricant in said chamber and forcibly dispensing the same through said coil of tubing.

JAMES CLARENCE BURFORD.